United States Patent
Sato et al.

(10) Patent No.: US 11,566,141 B2
(45) Date of Patent: Jan. 31, 2023

(54) INKJET INK COMPOSITION FOR TEXTILE PRINTING

(71) Applicant: SAKATA INX CORPORATION, Osaka (JP)

(72) Inventors: Yoichi Sato, Osaka (JP); Hiroyuki Konishi, Osaka (JP); Ayumi Minegishi, Osaka (JP); Ryuta Noda, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 499 days.

(21) Appl. No.: 16/635,961

(22) PCT Filed: Aug. 1, 2018

(86) PCT No.: PCT/JP2018/028769
§ 371 (c)(1),
(2) Date: Jan. 31, 2020

(87) PCT Pub. No.: WO2019/031321
PCT Pub. Date: Feb. 14, 2019

(65) Prior Publication Data
US 2020/0239717 A1    Jul. 30, 2020

(30) Foreign Application Priority Data
Aug. 8, 2017 (JP) .............................. JP2017-152919

(51) Int. Cl.
| | |
|---|---|
| C09D 11/326 | (2014.01) |
| C08G 18/10 | (2006.01) |
| C08G 18/50 | (2006.01) |
| C08G 18/79 | (2006.01) |
| C08G 18/80 | (2006.01) |
| D06P 1/52 | (2006.01) |
| D06P 1/54 | (2006.01) |
| D06P 5/30 | (2006.01) |

(52) U.S. Cl.
CPC ............ *C09D 11/326* (2013.01); *C08G 18/10* (2013.01); *C08G 18/5045* (2013.01); *C08G 18/797* (2013.01); *C08G 18/80* (2013.01); *D06P 1/5285* (2013.01); *D06P 1/54* (2013.01); *D06P 5/30* (2013.01)

(58) Field of Classification Search
CPC .............. C09D 11/326; C08G 18/5045; C08G 18/797; C08G 18/80
See application file for complete search history.

(56) References Cited

U.S. PATENT DOCUMENTS

| | | | |
|---|---|---|---|
| 8,431,195 B2 * | 4/2013 | Matsuzaki | ........... C09D 11/102 428/34.7 |
| 2006/0121204 A1 * | 6/2006 | Nakae | ................... C09D 175/04 427/402 |
| 2006/0205841 A1 | 9/2006 | Furuno et al. | |
| 2010/0214352 A1 | 8/2010 | Tsunoda et al. | |
| 2014/0210901 A1 * | 7/2014 | Ohashi | ................... D06P 1/928 347/93 |
| 2017/0165979 A1 | 6/2017 | Ohta | |

FOREIGN PATENT DOCUMENTS

| | | |
|---|---|---|
| JP | 2009215506 A | 9/2009 |
| JP | 2010150454 A | 7/2010 |
| JP | 2013082209 A | 5/2013 |
| JP | 2013151600 A | 8/2013 |
| JP | 2016011466 A | 1/2016 |
| JP | WO2016104248 A1 | 4/2017 |
| JP | 2017171907 A | 9/2017 |
| WO | 2016104248 A1 | 6/2016 |

OTHER PUBLICATIONS

Extended European Search Report (EESR) dated Apr. 12, 2021, issued for European counterpart patent application No. EP18844136.4 (7 pages).
Notification Concerning Transmittal of International Preliminary Report on Patentability (PCT/IB/326) and Notification of Transmittal of Translation of the International Preliminary Report on Patentability (PCT/IB/338) dated Feb. 20, 2020, with International Preliminary Report on Patentability (PCT/IB/373) and Written Opinion of the International Searching Authority (PCT/ISA/237), for corresponding international application PCT/JP2018/028769 (14 pages).
An Examination report issued by Intellectual Property India dated Jun. 5, 2021, for Indian counterpart application No. 202017004708. (5 pages).
International Search Report (ISR) dated Oct. 30, 2018, issued for International application No. PCT/JP2018/028769. (2 pages).

* cited by examiner

*Primary Examiner* — Michael L Leonard
(74) *Attorney, Agent, or Firm* — Law Office of Katsuhiro Arai

(57) ABSTRACT

An object is to achieve both good washing fastness and texture by combining a urethane resin of high fracture elongation with a small quantity of crosslinking agent. As a means for achieving the object, an inkjet ink composition for textile printing is provided that contains a pigment, a water-dispersible resin, a crosslinking agent, and water; wherein, as the water-dispersible resin, a resin of 1200 to 1800% in fracture elongation and 10 to 48 MPa in tensile strength is contained by 1.0 to 3.0 parts by mass relative to 1 part by mass of the pigment, and the crosslinking agent is contained by 0.03 to 0.17 parts by mass relative to 1 part by mass of the water-dispersible resin.

1 Claim, No Drawings

INKJET INK COMPOSITION FOR TEXTILE PRINTING

TECHNICAL FIELD

The present invention relates to an inkjet ink composition for textile printing.

BACKGROUND ART

As inkjet inks for textile printing, those combining a urethane resin of relatively low fracture elongation with a crosslinking agent are known, as described in Patent Literature 1; however, these inkjet inks present difficulty in achieving both sufficient washing fastness and good texture.

BACKGROUND ART LITERATURE

Patent Literature

Patent Literature 1: Japanese Patent Laid-open No. 2009-215506

SUMMARY OF THE INVENTION

Problems to be Solved by the Invention

In light of the above, an object of the present invention is to achieve both good washing fastness and texture by combining a urethane resin of high fracture elongation with a small quantity of crosslinking agent.

Means for Solving the Problems

The inventors studied in earnest to achieve the aforementioned object, and consequently obtained the inkjet ink composition for textile printing as described below:
1. An inkjet ink composition for textile printing containing a pigment, a water-dispersible resin, a crosslinking agent, and water; wherein, as the water-dispersible resin, a resin of 1200 to 1800% in fracture elongation and 10 to 48 MPa in tensile strength is contained by 1.0 to 3.0 parts by mass relative to 1 part by mass of the pigment, and the crosslinking agent is contained by 0.03 to 0.17 parts by mass relative to 1 part by mass of the water-dispersible resin.
2. An inkjet ink composition for textile printing according to 1, wherein the crosslinking agent represents one or more types selected from blocked isocyanate compounds, carbodiimide compounds, and oxazoline group-containing polymers.

Effects of the Invention

According to the inkjet ink composition for textile printing proposed by the present invention, significant effects in terms of excellent washing fastness, dry abrasion fastness, and texture can be demonstrated by the ink composition that has been printed on a fabric.

MODE FOR CARRYING OUT THE INVENTION

The inkjet ink composition for textile printing proposed by the present invention (hereinafter also referred to as "ink composition proposed by the present invention") is explained in detail below, primarily in regard to its components.

<Water-Dispersible Resin>

The water-dispersible resin under the present invention is preferably urethane resins, or more preferably, among them, a urethane resin containing anionic groups. Furthermore, the urethane resin is preferably a polyester polyurethane or polyether-polyester polyurethane.

Additionally, among these water-dispersible resins, a resin of 1200 to 1800% in fracture elongation and 10 to 48 MPa in tensile strength must be adopted.

If the fracture elongation is less than 1200%, texture and washing fastness will no longer be sufficient; if the fracture elongation exceeds 1800%, on the other hand, washing fastness will deteriorate.

Furthermore, if the tensile strength is less than 10 MPa, washing fastness will deteriorate; if the tensile strength exceeds 48 MPa, on the other hand, washing fastness will no longer be sufficient, or deteriorate.

Is.

As a water-dispersible resin having such physical properties, Impranil DLP-R (sulfonic acid group-containing aqueous polyester-polyurethane resin) manufactured by Sumika Covestro Urethane, Co., Ltd., Baybond (registered trademark) PU407 manufactured by Sumika Covestro Urethane, Co., Ltd., Superflex 300 (anionic polyester-polyether urethane resin) manufactured by DKS Co. Ltd., Superflex 740 (anionic polyurethane resin) manufactured by DKS Co. Ltd., DAOTAN (registered trademark) TW6491 manufactured by Daicel-Allnex LTD, DAOTAN (registered trademark) TW6495 manufactured by Daicel-Allnex LTD, and the like may be used.

Additionally, the water-dispersible resin must be contained by 1.0 to 3.0 parts by mass relative to 1 part by mass of the pigment.

If the content is less than 1.0 part by mass, washing fastness and dry abrasion fastness will drop. If it exceeds 3.0 parts by mass, on the other hand, post-cure texture will become poor.

Under the present invention, preferably only one type of water-dispersible resin is used. Even when two or more types are used, all these resins must satisfy the physical properties described in the present invention.

It should be noted that, to the extent that the effects of the present invention will be demonstrated, other resins may be used along with the water-dispersible resin described in the present invention.

<Crosslinking Agent>

For the crosslinking agent under the present invention, one or more types selected from blocked isocyanate compounds, carbodiimide compounds, oxazoline group-containing polymers, epoxy compounds, formaldehyde adducts of urea, melamine, benzoguanamine, etc., multifunctional aziridine compounds, and others, may be used. Moreover, among these, a blocked isocyanate compound, carbodiimide compound, or oxazoline group-containing polymer is preferred.

Furthermore, a crosslinking agent which is dispersed, emulsified, or dissolved in water, or which can be dispersed, emulsified, and/or dissolved in water, is particularly preferred.

Also, under the present invention, the crosslinking agent must be contained by 0.03 to 0.17 parts by mass, but it may be contained by preferably 0.05 to 0.15 parts by mass, or more preferably 0.07 to 0.12 parts by mass, relative to 1 part by mass of the water-dispersible resin.

If the content is less than 0.03 parts by mass, washing fastness and dry abrasion fastness will drop. If it exceeds 0.17 parts by mass, on the other hand, post-cure texture will become poor.

Blocked isocyanate compounds used as crosslinking agents under the present invention are polyisocyanate compounds whose active isocyanate groups have been reacted with a phenol or other blocking agent, and made inactive. Blocked isocyanate compounds, in as-is condition, cannot cause crosslinking reaction and remain chemically stable, but they will be able to cause crosslinking reaction once the blocking groups bonded with the isocyanate groups are dissociated through heat treatment, etc., and active isocyanate groups are formed.

The compound that constitutes the polyisocyanate part of a blocked isocyanate compound is preferably a diisocyanate compound, triisocyanate compound, or polyisocyanate compound, such as hexamethylene diisocyanate, trimethyl hexamethylene diisocyanate, hexamethylene triisocyanate, lysine ester triisocyanate, isophorone diisocyanate, hydrogenated xylylene diisocyanate, toluene diisocyanate, xylene diisocyanate, diphenyl methane diisocyanate, etc. Among these, a triisocyanate compound, such as a tris-biuret-modified product of hexamethylene diisocyanate or other modified hexamethylene diisocyanate is more preferred.

Such compound that constitutes the polyisocyanate part may be a polyisocyanate compound having two or more isocyanate groups per molecule, examples of which include diisocyanate compounds, triisocyanate compounds, tetraisocyanate compounds, pentaisocyanate compounds, hexaisocyanate compounds, and various types of polyisocyanate compounds. Specific examples of polyisocyanate compounds include: tolylene diisocyanate, xylylene diisocyanate, diphenyl methane diisocyanate, biphenyl diisocyanate, 3,3'-dimethyl-4,4'-biphenylene diisocyanate, methylene bis(phenyl isocyanate), isophorone diisocyanate, and other aromatic polyisocyanates; hydrogenated tolylene diisocyanate, hydrogenated xylylene diisocyanate, hydrogenated diphenyl methane diisocyanate, and other alicyclic polyisocyanates; 1,4-tetramethylene diisocyanate, hexamethylene diisocyanate, 2,2,4-trimethyl hexamethylene diisocyanate, other aliphatic polyisocyanates, and the like. One type of polyisocyanate compound may be used, or multiple types of polyisocyanate compounds may be used, to constitute the blocked isocyanate compound pertaining to this embodiment. From the viewpoint of minimizing an outflow of adhesive, preferably the polyisocyanate compound that constitutes the blocked isocyanate compound pertaining to this embodiment contains a triisocyanate compound.

The blocking agent pertaining to the blocked isocyanate compound is not limited in any way. Besides a phenol as mentioned above, a cresol, ethyl phenol, butyl phenol, 2-hydroxy pyridine, dimethyl malonate, diethyl malonate, methyl acetoacetate, ethyl acetoacetate, acetyl acetone, butyl mercaptan, dodecyl mercaptan, acetanilide, amide acetate, ε-caprolactam, δ-valerolactam, γ-butyrolactam, imide succinate, imide maleate, imidazole, 2-methyl imidazole, urea, thiourea, ethylene urea, formaldoxime, acetaldoxime, acetone oxime, methyl ethyl ketoxime, methyl isobutyl ketoxime, cyclohexanone oxime, carbazole, dimethyl pyrazole, triazole, etc., may be used. One type of blocking agent may be used, or multiple types of blocking agents may be used, to constitute the blocked isocyanate compound pertaining to this embodiment. Additionally, how a blocking agent is combined with a polyisocyanate compound is not limited in any way, in that there may be multiple combinations thereof and that the blocked isocyanate compound pertaining to this embodiment may be constituted by multiple types of compounds.

Preferably the blocked isocyanate compound is of thermal decomposition type. When it is of thermal decomposition type, the temperature at which the reaction to dissociate the blocking agent, or specifically the deblocking reaction, becomes prominent (hereinafter referred to as "deblocking temperature") can be adjusted based on the type of the blocking agent, type of the polyisocyanate compound to be blocked, and so on. While the specific level of this deblocking temperature is not limited in any way, assume that this temperature is 70 to 130° C., for example; in this case, the inkjet ink composition for textile printing that contains a blocked isocyanate compound having such deblocking temperature will have a low, or virtually zero, crosslinking point density before crosslinking. However, the crosslinking density can be increased by promoting the crosslinking reaction to form crosslinked structures.

Preferably the carbodiimide compound is one having two or more carbodiimide groups, examples of which include, for example: poly(4,4'-diphenyl methane carbodiimide), poly(p-phenylene carbodiimide), poly(m-phenylene carbodiimide), poly(diisopropyl phenyl carbodiimide), poly(triisopropyl phenyl carbodiimide), and other aromatic polycarbodiimides; poly(dicyclohexyl methane carbodiimide) and other alicyclic polycarbodiimides; and poly(diisopropyl carbodiimide) and other aliphatic polycarbodiimides, and the like. The functional group (a) in the urethane resin (A) that reacts with the functional group contained in the aforementioned carbodiimide compound may be a carboxyl group, for example.

Furthermore, a carbodiimide compound containing average 3 to 20, particularly preferably average 4 to 8, carbodiimide constitutional units per molecule, is preferred.

Such carbodiimide compound may be blended, depending on the situation, with, for example, a monofunctional isocyanate (such as stearyl isocyanate, phenyl isocyanate, butyl isocyanate, or hexyl isocyanate) and/or high-functional isocyanate (such as a trimer of any of the diisocyanates mentioned below, uretdione, allophanate, or biuret), and is obtained by carbodiimidizing a diisocyanate (such as tetramethylene diisocyanate, methyl pentamethylene diisocyanate, hexamethylene diisocyanate, dodecamethylene diisocyanate, 1,4-diisocyanato cyclohexane, 1-isocyanato-3,3,5-trimethyl-5-isocyanato methyl cyclohexane, 4,4'-diisocyanato dicyclohexyl methane, 4,4'-diisocyanato dicyclohexyl propane-(2,2), 1,4-diisocyanato benzene, 2,4-diisocyanato toluene, 2,6-diisocyanato toluene, 4,4'-diisocyanato diphenyl methane, 2,2'-diisocyanato diphenyl methane, 2,4'-diisocyanato diphenyl methane, tetramethyl xylylene diisocyanate, p-xylylene diisocyanate, or p-isopropylidene diisocyanate), concurrently or before/after reacting it with a hydrophilic component (such as an alcohol or monofunctional or bifunctional polyether based on amine-initiated ethylene oxide/propylene oxide copolymer or ethylene oxide polymer).

The oxazoline group-containing polymer may be, for example, a polymer comprising one type, or two or more types in combination, selected from the following: 2,2'-bis(2-oxazoline), 1,2-bis(2-oxazoline-2-yl)ethane, 1,4-bis(2-oxazoline-2-yl)butane, 1,8-bis(2-oxazoline-2-yl)butane, 1,4-bis(2-oxazoline-2-yl)cyclohexane, 1,2-bis(2-oxazoline-2-yl)benzene, 1,3-bis(2-oxazoline-2-yl)benzene, and other aliphatic or aromatic bis-oxazoline compounds; and 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and other addition-polymerizable oxazolines. Any of these oxazoline group-containing polymers may be used alone, or two or more types may be combined.

Also, the functional group in the water-dispersible resin that reacts with the functional group contained in the oxazoline group-containing polymer may be a carboxyl group, for example.

<Organic Solvent>

The present invention may contain a water-soluble organic solvent for the purpose of improving the printability of the inkjet ink composition for textile printing, and the like. Such water-soluble organic solvent is selected from dipropylene glycol dimethyl ether, diethylene glycol ethyl methyl ether and other glycol ethers, glycol ether esters, alcohols, ketones, organic carbonates, and mixtures thereof.

Additionally, the content of such water-soluble organic solvent is preferably 20 percent by mass or less, or more preferably 15 percent by mass or less, or yet more preferably 10 percent by mass or less, in the inkjet ink composition for textile printing. A content exceeding 20 percent by mass may present problems in terms of viscosity, discharge property, and physical properties of the ink coating film.

<Pigment>

The inkjet ink composition for textile printing proposed by the present invention may be constituted to contain a pigment of each hue, in order to obtain an inkjet ink composition for textile printing having each color.

For such pigments, any organic pigments, inorganic pigments, or other pigments traditionally used in standard ink compositions for inkjet printing may be used without any particular limitations. Also, resin-coated pigments, each formed by coating an organic or inorganic pigment with a resin layer, may also be adopted.

Organic pigments include, for example, dye lake pigments as well as azo-, benzimidazolone-, phthalocyanine-, quinacridone-, anthraquinone-, dioxazine-, indigo-, thioindigo-, perylene-, perinone-, diketopyrrolopyrrole-, isoindolinone-, nitro-, nitroso-, anthraquinone-, flavanthrone-, quinophthalone-, pyranthrone-, indanthrone-based and other pigments, and the like. Inorganic pigments include carbon black, titanium oxide, red iron oxide, graphite, iron black, chrome oxide green, aluminum hydroxide, etc.

Also, specific examples of pigments, by each representative hue, for the inkjet ink compositions for textile printing proposed by the present invention, are as follows.

First, yellow pigments used as an inkjet ink composition for textile printing include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., where preferred choices include C. I. Pigment Yellow 13, 14, 17, 74, 155, 213, etc.

Magenta pigments used as an inkjet ink composition for textile printing include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., where preferred choices include C. I. Pigment Red 122, 202, C. I. Pigment Violet 19, etc.

Cyan pigments used as an inkjet ink composition for textile printing include, for example, C. I. Pigment Blue 1, 2, 3, 15, 15:1, 15:2, 15:3, 15:4, 15:6, 16, 18, 22, 27, 29, 60, etc., where preferred choices include C. I. Pigment Blue 15:3, etc.

Black pigments used as an inkjet ink composition for textile printing include, for example, carbon black (C. I. Pigment Black 7), etc.

White pigments used as an inkjet ink composition for textile printing include, for example, titanium oxide, aluminum oxide, etc., where preferred choices include titanium oxides whose surface has been treated with alumina, silica, and various other materials.

Preferably the pigment content in the inkjet ink composition for textile printing proposed by the present invention is 1 to 20 percent by mass relative to the total quantity of inkjet ink composition for textile printing. If the pigment content is less than 1 percent by mass, the image quality of the obtained printed matter tends to drop. If the content exceeds 20 percent by mass, on the other hand, the viscosity properties of the inkjet ink composition for textile printing tend to be negatively affected.

<Pigment Dispersant>

Also, the inkjet ink composition for textile printing proposed by the present invention may further contain a pigment dispersant, as necessary.

A pigment dispersant is used to further improve the dispersibility of the pigment and the preservation stability of the ink composition proposed by the present invention, and although any of traditionally-used pigment dispersants may be used without any particular limitations, among them, use of a polymeric dispersant is preferred. Such pigment dispersants include carbodiimide dispersants, polyester amine dispersants, aliphatic amine dispersants, modified polyacrylate dispersants, modified polyurethane dispersants, multi-chain polymeric nonionic dispersants, polymeric ionic activators, and the like. Any of these pigment dispersants may be used alone, or two or more types may be combined.

In particular, use of an acrylic acid/lauryl acrylate/styrene copolymer, as an anionic group-containing resin, is preferred.

Preferably the aforementioned pigment dispersant is contained by 1 to 200 parts by mass when the total pigment quantity used represents 100 parts by mass. If the content of pigment dispersant is less than 1 part by mass, the dispersibility of pigment, and the storage stability of the ink composition proposed by the present invention, may drop. On the other hand, adjusting the content to exceed 200 parts by mass, although possible, may not lead to any difference in the effects. A more preferable lower limit, and a more preferable upper limit, of the content of pigment dispersant, are 5 parts by mass and 60 parts by mass, respectively.

<Surface-Active Agent>

Preferably the inkjet ink composition for textile printing proposed by the present invention contains, according to the inkjet head to be used, a silicone surface-active agent or other surface-active agent which is traditionally used in inkjet ink compositions as a surface-active agent, in order to improve discharge stability.

Specific examples of silicone surface-active agents include polyether-modified silicone oil, polyester-modified polydimethyl siloxane, polyester-modified methyl alkyl polysiloxane, and the like. Any of these may be used alone, or two or more types may be combined.

Preferably the content of surface-active agent in the ink composition proposed by the present invention is 0.005 to 1.0 percent by mass. If the content is less than 0.005 percent by mass, the surface tension of the inkjet ink composition for textile printing proposed by the present invention will increase, and therefore the stability of its discharge from the inkjet head will drop. If the content exceeds 1.0 percent by mass, on the other hand, more bubbles will generate in the inkjet ink composition for textile printing and its discharge stability will drop as a result.

<Additives>

Various additives may be added to the inkjet ink composition for textile printing proposed by the present invention, as necessary, to manifest various functionalities. Specific examples include photostabilizers, surface treatment agents, antioxidants, antiaging agents, crosslinking promoters, plasticizers, preservatives, pH-adjusting agents, defoaming agents, moisturizing agents, etc. Also, non-curable resins that function as vehicles may or may not be blended in.

The method for preparing the ink composition proposed by the present invention is not limited in any way, and any traditionally known method for obtaining ink compositions for printing or ink compositions for textile printing may be adopted. To be specific, a method whereby an anionic group-containing resin is dissolved in an aqueous alkaline solution beforehand, and then a pigment is added thereto and the mixture is kneaded, may be adopted.

The methods for printing and curing the inkjet ink composition for textile printing proposed by the present invention specifically include one whereby the ink composition proposed by the present invention is discharged onto a base material from an inkjet head, after which the coating film of the ink composition proposed by the present invention that has landed on the base material is heated and thus cured.

For example, the ink composition proposed by the present invention may be discharged onto the base material (printing of images) by means of supplying it to a low-viscosity printer head of an inkjet recording printer and discharging the ink composition from the printer head so that the thickness of the coating film on the base material becomes 1 to 60 μm, for example.

For the inkjet recording printer device with which to print the inkjet ink composition for textile printing proposed by the present invention, any traditionally-used inkjet recording printer device may be utilized.

For the device used for heating and curing, any known device for curing thermally-curable ink compositions may be adopted. The heat source may be an infrared light, electrically-heated wire, iron or other device that heats a base material by directly contacting the base material.

<Fabrics>

Base materials to be printed with the inkjet ink composition for textile printing proposed by the present invention may be any traditionally-used fabrics; for example, fabrics made of cotton, silk, linen, rayon, acetate, nylon or polyester fibers, or mixed fabrics made of two or more types of fibers selected from the foregoing, may be used.

Examples

Preparation of Inkjet Ink Compositions for Textile Printing

The present invention is explained in greater detail below using examples; however, the present invention is not limited to these examples. It should be noted that, unless otherwise specified, "%" means "percent by mass," while "part(s)" means "part(s) by mass."

The materials used in the Examples and Comparative Examples below are as follows.

It should be noted that the fracture elongation and tensile strength of each water-dispersible resin were obtained under the conditions described below.

Each water-dispersible resin was applied onto a polytetrafluoroethylene sheet and dried for 12 hours at room temperature, and then dried further for 6 hours at 60° C., after which the sheet was peeled off to create a resin film of 500 μm in film thickness constituted by the water-dispersible resin.

Using a tensile tester (manufactured by Yasuda Seiki Seisakusho), and at a measurement temperature of 25° C. and pulling rate of 200 mm/min, the obtained resin film was pulled until fracture, upon which the corresponding strength and elongation were measured.

TABLE 1

| | Product name (Manufactured by) | Solid content (% by mass) | Fracture elongation (%) | Tensile strength (MPa) |
|---|---|---|---|---|
| Water-dispersible resin (1) | Impranil DLP-R (Sumika Covestro Urethane, Co., Ltd.) | 50 | 1600 | 10 |
| Water-dispersible resin (2) | Baybond PU407 (Sumika Covestro Urethane, Co., Ltd.) | 40 | 1200 | 40 |
| Water-dispersible resin (3) | Superflex 300 (DKS Co. Ltd.) | 30 | 1500 | 20 |
| Water-dispersible resin (4) | Superflex 740 (DKS Co. Ltd.) | 40 | 1300 | 10 |
| Water-dispersible resin (5) | DAOTAN TW6491 (Daicel-Allnex LTD) | 33 | 1400 | 15 |
| Water-dispersible resin (6) | DAOTAN TW6495 (Daicel-Allnex LTD) | 35 | 1480 | 33 |
| Water-dispersible resin (7) | TAKELAC WS-6021 (Mitsui Chemicals, Inc.) | 30.5 | 750 | 50 |
| Water-dispersible resin (8) | YODOSOL RA85 (Henkel Japan Ltd.) | 40 | 400 | 30 |
| Water-dispersible resin (9) | ADEKA BONTIGHTER HUX-394 (ADEKA Corporation) | 62 | 1500 | 50 |
| Water-dispersible resin (10) | VONCOAT R-3310 (DIC Corporation) | 45 | 700 | 1.8 |

TABLE 2

| | Product name (Manufactured by) | Structure | Solid content (% by mass) |
|---|---|---|---|
| Crosslinking agent (1) | Bayhydur BL2867 (Sumika Covestro Urethane, Co., Ltd.) | Blocked isocyanate compound | 38 |
| Crosslinking agent (2) | CARBODILITE SV-02 (Nisshinbo Chemical Inc.) | Carbodiimide compound | 40 |
| Crosslinking agent (3) | EPOCROS WS-700 (Nippon Shokubai CO., LTD.) | Oxazoline group-containing polymer | 25 |

(Preparation of Aqueous Resin Varnish)

Twenty-five parts by mass of the below-mentioned anionic group-containing resin were dissolved in a mixed liquid of 4.9 parts by mass of potassium hydroxide and 70.1 parts by mass of water, to obtain an aqueous resin varnish of 25 percent by mass in solid content of anionic group-containing resin.

Pigment: PRINTEX 90 (carbon black, manufactured by Orion Engineered Carbons)

Anionic group-containing resin: Acrylic acid/lauryl acrylate/styrene copolymer (weight-average molecular weight 30000, acid value 185 mgKOH/g)

(Preparation of Pigment Dispersion Liquid)

To 32 parts by mass of the aforementioned aqueous resin varnish, 48 parts by mass of water were added and the ingredients were mixed, to prepare a resin varnish for pigment dispersion. To this resin varnish for pigment dispersion, 20 parts by mass of PRINTEX 90 were added further as a pigment and the ingredients were mixed under agitation, after which the mixture was kneaded using a wet circulation mill, to prepare a pigment dispersion liquid.
(Preparation of Inkjet Ink Compositions for Textile Printing)

To the aforementioned pigment dispersion liquid, water-dispersible resins, crosslinking agents, water, water-soluble solvents (glycerin, 2-pyrrolidone), and surface-active agents (Olfine E1010, Surfynol 440) were added to prepare inkjet ink compositions for textile printing.
(Evaluation Methods)
(Washing Fastness)

Each printed fabric was washed five times normally (washing conditions: wash in a standard mode→spin→dry) using a home washing machine, and then evaluated for the degree of fading after washing, compared to before washing, using the discoloration grayscale.

⊙: Level 5, ○: Level 4 to 4-5, Δ: Level 3-4 to 4, x: Level 3 or lower
(Dry Abrasion Fastness)

Evaluation using the discoloration grayscale based on test conducted with a type II tester according to the drying conditions per JIS L0849.

●: Level 4-5 to 5, ○: Level 3-4 to 4, Δ: Level 2-3 to 3, x: Level 2 or lower
(Texture)

Evaluation by touching each printed fabric.

●: The printed fabric creases easily, preserving softness close to that of the original 100% cotton fabric.

○: The printed fabric creases easily, but a little more roughness is felt compared to the original fabric.

Δ: The printed fabric feels rough.

x: The printed fabric is so hard that it does not crease freely.

TABLE 3

|  | Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Pigment-dispersion liquid | 23.5 | 23.5 | 23.5 | 23.5 | 23.5 | 23.5 | 23.5 | 23.5 | 23.5 | 23.5 |
| Water-dispersible resin (1) | 12.0 | 12.0 | 12.0 | 12.0 | 12.0 | 21.0 | | | | |
| Water-dispersible resin (2) | | | | | | | 15.0 | | | |
| Water-dispersible resin (3) | | | | | | | | 20.0 | | |
| Water-dispersible resin (4) | | | | | | | | | 15.0 | |
| Water-dispersible resin (5) | | | | | | | | | | 18.2 |
| Water-dispersible resin (6) | | | | | | | | | | |
| Water-dispersible resin (7) | | | | | | | | | | |
| Water-dispersible resin (8) | | | | | | | | | | |
| Water-dispersible resin (9) | | | | | | | | | | |
| Water-dispersible resin (10) | | | | | | | | | | |
| Crosslinking agent (1) | 0.8 | 1.6 | 2.4 | | | 1.6 | 1.6 | 1.6 | 1.6 | 1.6 |
| Crosslinking agent (2) | | | | 1.6 | | | | | | |
| Crosslinking agent (3) | | | | | 2.6 | | | | | |
| Olfine E1010 | 0.2 | 0.2 | 0.2 | 0.2 | 0.2 | 0.2 | 0.2 | 0.2 | 0.2 | 0.2 |
| Surfynol 440 | 0.5 | 0.5 | 0.5 | 0.5 | 0.5 | 0.5 | 0.5 | 0.5 | 0.5 | 0.5 |
| Glycerin | 25.0 | 25.0 | 25.0 | 25.0 | 25.0 | 25.0 | 25.0 | 25.0 | 25.0 | 25.0 |
| 2-pyrrolidone | 9.0 | 9.0 | 9.0 | 9.0 | 9.0 | 9.0 | 9.0 | 9.0 | 9.0 | 9.0 |
| Water | 29 | 28.2 | 27.4 | 28.2 | 27.2 | 19.2 | 25.2 | 20.2 | 25.2 | 22 |
| Total | 100.0 | 100.0 | 100.0 | 100.0 | 100.0 | 100.0 | 100.0 | 100.0 | 100.0 | 100.0 |
| Resin quantity relative to pigment (ratio by mass) | 1.3 | 1.3 | 1.3 | 1.3 | 1.3 | 2.2 | 1.3 | 1.3 | 1.3 | 1.3 |
| Crosslinking agent quantity relative to resin (ratio by mass) | 0.05 | 0.10 | 0.15 | 0.10 | 0.10 | 0.05 | 0.10 | 0.10 | 0.10 | 0.10 |
| Evaluation results | | | | | | | | | | |
| Washing fastness | ⊙ | ⊙ | ⊙ | ⊙ | ⊙ | ⊙ | ⊙ | ⊙ | ⊙ | ⊙ |
| Dry abrasion fastness | ○ | ○ | ○ | ○ | ○ | ⊙ | ○ | ○ | ○ | ○ |
| Texture | ⊙ | ⊙ | ⊙ | ⊙ | ⊙ | ○ | ⊙ | ⊙ | ⊙ | ⊙ |

TABLE 4

|  | Examples | Comparative Examples | | | | | | | | |
| --- | --- | --- | --- | --- | --- | --- | --- | --- | --- | --- |
|  | 11 | 1 | 2 | 3 | 4 | 5 | 6 | 7 | 8 | 9 |
| Pigment dispersion liquid | 23.5 | 23.5 | 23.5 | 23.5 | 23.5 | 23.5 | 23.5 | 23.5 | 23.5 | 23.5 |
| Water-dispersible resin (1) | | 12.0 | 8.0 | 31.0 | 12.0 | 12.0 | | | | |
| Water-dispersible resin (2) | | | | | | | | | | |
| Water-dispersible resin (3) | | | | | | | | | | |
| Water-dispersible resin (4) | | | | | | | | | | |
| Water-dispersible resin (5) | | | | | | | | | | |
| Water-dispersible resin (6) | 17.1 | | | | | | | | | |
| Water-dispersible resin (7) | | | | | | | 23.1 | | | |
| Water-dispersible resin (8) | | | | | | | | 15.0 | | |
| Water-dispersible resin (9) | | | | | | | | | 9.7 | |
| Water-dispersible resin (10) | | | | | | | | | | 13.3 |

TABLE 4-continued

|  | Examples | Comparative Examples | | | | | | | | |
| --- | --- | --- | --- | --- | --- | --- | --- | --- | --- | --- |
|  | 11 | 1 | 2 | 3 | 4 | 5 | 6 | 7 | 8 | 9 |
| Crosslinking agent (1) | 1.6 |  | 1.1 | 1.6 | 0.15 | 3.2 | 6.1 | 1.6 | 1.6 | 1.6 |
| Crosslinking agent (2) |  |  |  |  |  |  |  |  |  |  |
| Crosslinking agent (3) |  |  |  |  |  |  |  |  |  |  |
| Olfine E1010 | 0.2 | 0.2 | 0.2 | 0.2 | 0.2 | 0.2 | 0.2 | 0.2 | 0.2 | 0.2 |
| Surfynol 440 | 0.5 | 0.5 | 0.5 | 0.5 | 0.5 | 0.5 | 0.5 | 0.5 | 0.5 | 0.5 |
| Glycerin | 25.0 | 25.0 | 25.0 | 25.0 | 25.0 | 25.0 | 25.0 | 25.0 | 25.0 | 25.0 |
| 2-pyrrolidone | 9.0 | 9.0 | 9.0 | 9.0 | 9.0 | 9.0 | 9.0 | 9.0 | 9.0 | 9.0 |
| Water | 23.1 | 29.8 | 32.7 | 9.2 | 29.65 | 26.6 | 12.6 | 25.2 | 30.5 | 26.9 |
| Total | 100.0 | 100.0 | 100.0 | 100.0 | 100.0 | 100.0 | 100.0 | 100.0 | 100.0 | 100.0 |
| Resin quantity relative to pigment (ratio by mass) | 1.3 | 1.3 | 0.9 | 3.1 | 1.3 | 1.3 | 1.5 | 1.3 | 1.3 | 1.3 |
| Crosslinking agent quantity relative to resin (ratio by mass) | 0.10 | 0 | 0.10 | 0.10 | 0.01 | 0.20 | 0.33 | 0.10 | 0.10 | 0.10 |
| Evaluation results |  |  |  |  |  |  |  |  |  |  |
| Washing fastness | ⊙ | Δ | Δ | ⊙ | Δ | ⊙ | ○ | ○ | Δ | Δ |
| Dry abrasion fastness | ○ | Δ | X | ⊙ | Δ | ○ | ○ | ○ | ○ | ○ |
| Texture | ⊙ | ⊙ | ⊙ | X | ⊙ | Δ | ○ | Δ | ⊙ | ⊙ |

(Textile Printing Method)

A 100% cotton white fabric was printed solid with each of the black inkjet ink compositions for textile printing in the Examples and Comparative Examples, using an evaluation printer equipped with a head manufactured by SPECTRA. Thereafter, a heat press machine was used to heat the printed area at 170° C. for 60 seconds, thereby fixing the black inkjet ink composition for textile printing on the fabric and thus obtaining a printed fabric.

The Examples conforming to the present invention resulted in particularly good washing fastness as well as good dry abrasion fastness and texture.

By contrast, Comparative Example 1 using no crosslinking agent, Comparative Example 2 using a smaller resin quantity relative to pigment, and Comparative Example 4 using a smaller crosslinking agent quantity relative to resin, resulted in washing fastness and dry abrasion fastness that were insufficient.

Comparative Example 3 using a greater resin quantity relative to pigment, and Comparative Example 5 using a greater crosslinking agent quantity relative to resin, resulted in poor texture.

Comparative Example 6 using a water-dispersible resin demonstrating low fracture elongation and high tensile strength, resulted in slightly poor washing fastness.

Comparative Example 7 using a water-dispersible resin demonstrating low fracture elongation and low tensile strength, resulted in particularly poor texture. Similarly, Comparative Example 9 using a water-dispersible resin demonstrating low fracture elongation and low tensile strength, also resulted in particularly poor washing fastness.

Comparative Example 8 using a water-dispersible resin demonstrating high fracture elongation and high tensile strength, resulted in poor washing fastness.

What is claimed is:

1. An inkjet ink composition for textile printing containing a pigment, a water-dispersible resin including a urethane resin, a crosslinking agent being a blocked isocyanate compound and/or carbodiimide compound, and water; wherein, as the water-dispersible resin, the urethane resin which has a fracture elongation of 1300 to 1800% and a tensile strength of 10 to 48 MPa, is contained by 1.0 to 3.0 parts by mass relative to 1 part by mass of the pigment, and the crosslinking agent is contained by 0.03 to 0.12 parts by mass relative to 1 part by mass of the water-dispersible resin.

* * * * *